United States Patent
Currie et al.

(10) Patent No.: US 7,930,701 B2
(45) Date of Patent: Apr. 19, 2011

(54) JMS INTEGRATION INTO AN APPLICATION SERVER

(75) Inventors: David J. Currie, Eastleigh (GB); Vernon M. Green, Newbury (GB); Doina L. Klinger, Southampton (GB); Andrew M. Leonard, Bishops Waltham (GB)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 12/104,426

(22) Filed: Apr. 16, 2008

(65) Prior Publication Data

US 2008/0216090 A1 Sep. 4, 2008

Related U.S. Application Data

(63) Continuation of application No. 10/448,268, filed on May 29, 2003, now Pat. No. 7,418,708.

(30) Foreign Application Priority Data

Nov. 15, 2002 (GB) .................................. 0226655.9

(51) Int. Cl.
*G06F 13/00* (2006.01)
(52) U.S. Cl. ......... 719/313; 719/315; 709/227; 709/228
(58) Field of Classification Search .................. 719/313, 719/315; 709/227, 228
See application file for complete search history.

(56) References Cited

U.S. PATENT DOCUMENTS

| | | | |
|---|---|---|---|
| 6,832,238 B1 | 12/2004 | Sharma et al. |
| 7,089,568 B2 | 8/2006 | Yoshida et al. |
| 7,089,584 B1 | 8/2006 | Sharma |
| 7,165,249 B2 | 1/2007 | Potter et al. |
| 2003/0115366 A1 | 6/2003 | Robinson |
| 2003/0182426 A1 | 9/2003 | Hapner et al. |

OTHER PUBLICATIONS

"Java 2 Platform Enterprise Edition Specification V1.3", Sun Microsystems, Contents, pp. i-xi and Chapter 1, Introduction, pp. 1-16 Jul. 27, 2001.

Hapner, M. et al., "Java Message Service Specification, V1.1", Sun Microsystems, Contents and Chapters 1-2, pp. 1-27 Apr. 12, 2002.

Jeyaraman, R., "J2EE Connector Architecture Specification", *Java 2 Enterprise Edition*, V1.5 Sun Microsystems Inc., Introduction, pp. 1Â•12 and Chapter 6, pp. 38-69 May, 14, 2002.

*Primary Examiner* — Andy Ho
(74) *Attorney, Agent, or Firm* — DeLizio Gilliam, PLLC

(57) ABSTRACT

A JMS implementation integrates into an application server based on the JCA Architecture. A JMS Connection is integrated based on one implementation of a JCA which sets transactional context for the JMS Connection to "no transaction", and the JMS Session is integrated based on a second implementation of the JCA which ignores any security credentials provided. The application is unaware that it is dealing with a JCA implementation and not directly with the JMS implementation and the JMS implementation is unaware that it is being called via the JCA implementation and not directly from the application.

20 Claims, 10 Drawing Sheets

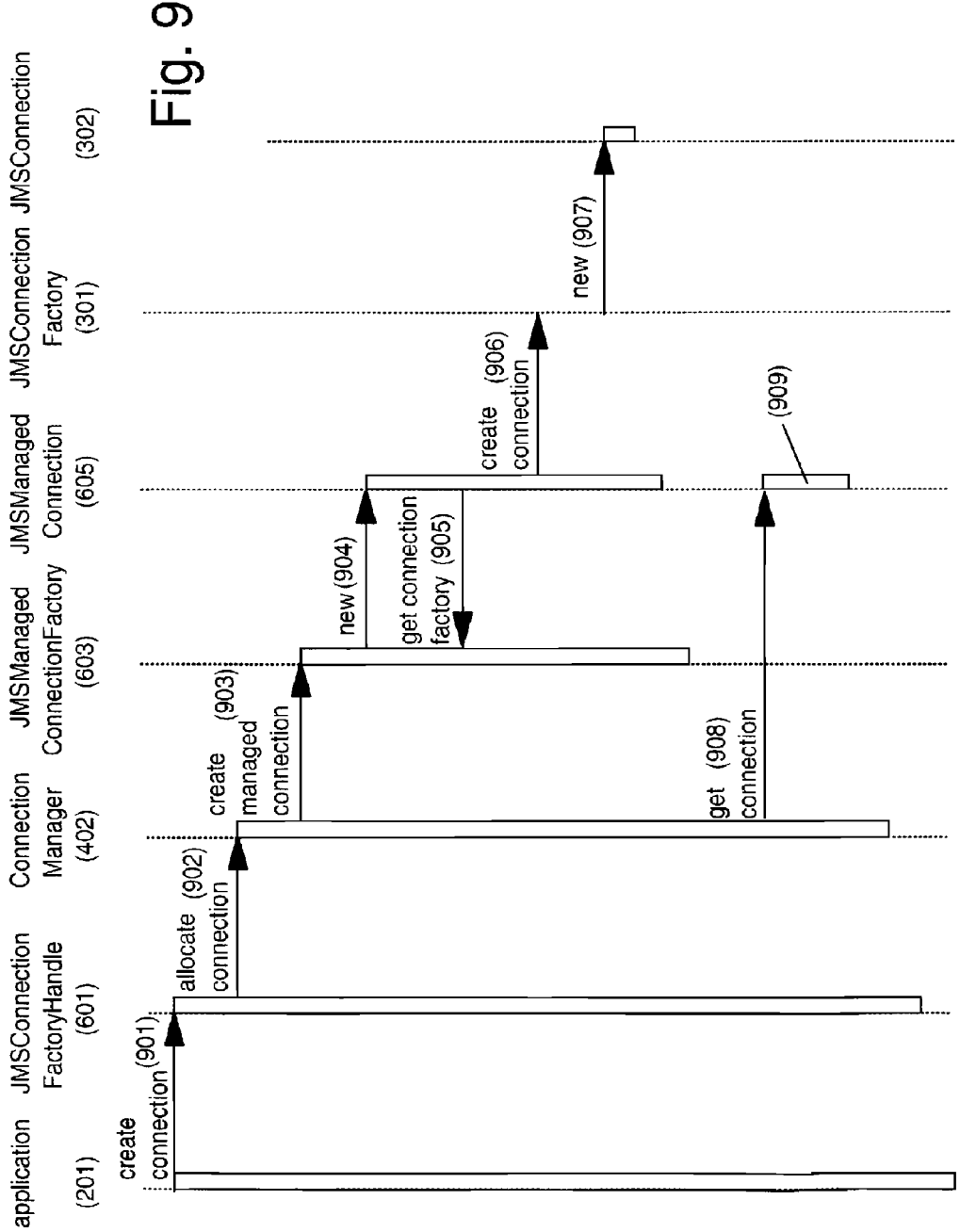

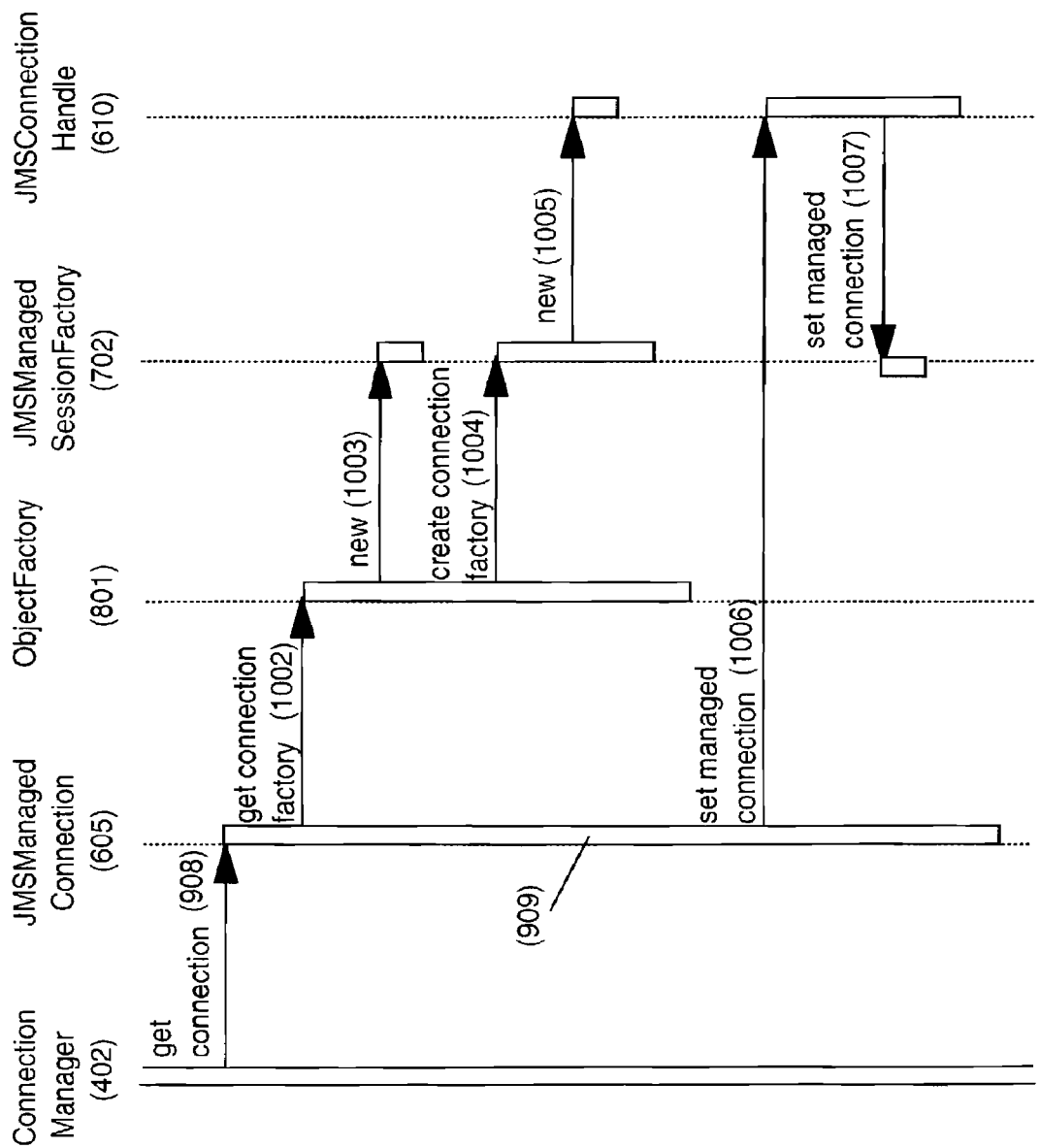

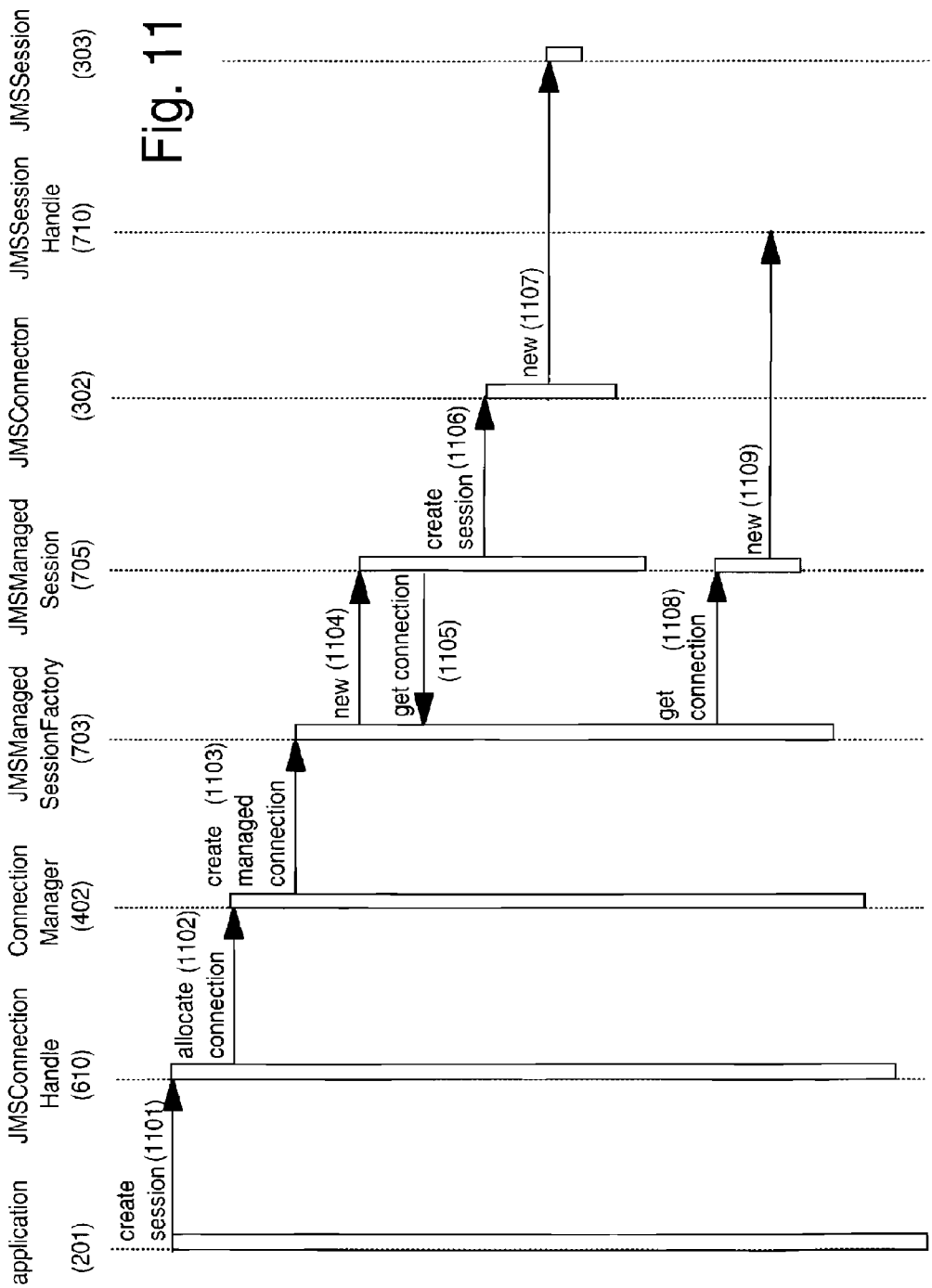

JMS INTEGRATION INTO AN APPLICATION SERVER

RELATED APPLICATIONS

This application is a continuation of U.S. patent application Ser. No. 10/448,268 now U.S. Pat. No. 7,418,708 filed on May 29, 2003 which claims priority to United Kingdom patent application number GB 0226655.9 filed Nov. 15, 2002, now abandoned.

BACKGROUND

The present invention relates to application servers in the J2EE (Java 2 Enterprise Edition) environment and more specifically to integration of a Java Message Service implementation into an application server in this environment. (J2EE and Java are registered trademarks of Sun Microsystems Inc.)

Client/Server computing first became fashionable in the 1960's as a good method of providing many users of small machines (clients) access to data maintained by large systems (servers), the data being maintained in a database. A typical client/server architecture is one in which the client accesses the server through middleware. In this architecture the client is fairly simple and uses applications that run in a server and the middleware handles the complexities of, for example, client/server communication and transaction management. This enables the application writer to concentrate on client and application functionality whilst the middleware takes care of the rest. However, one problem that developed in this architecture was that many middleware products came to the market each providing different functions and different interfaces to those functions. As a result client and application code had to be written to interface with a particular middleware product and could not easily be ported between different middleware products. Further the clients written for one middleware product could not access applications written for a different middleware product.

In order to solve this problem the middleware industry started to look into specifying a standard middleware architecture and interface. There have been several attempts at this and one such attempt was the Common Object Request Broker Architecture (CORBA) which was first published in 1991. However whilst CORBA has been successful and implemented in several middleware products it has been largely superseded by the Enterprise JavaBeans architecture which provides a method of making JavaBeans applications available in a distributed client/server environment. (JavaBeans is a registered trademark of Sun Microsystems Inc.)

The first EJB specification was published in March 1998 and was the culmination of several years work between Sun Microsystems Inc. and partner companies, such as IBM, Oracle and Hewlett Packard. From this date there have been many implementations of EJB server products and much has been written about the subject. Indeed most aspects of EJB could now be considered well known and well researched by those skilled in art. From this early specification there are now several specifications each relating to different aspect of EJBs, such as the Java 2 Enterprise Edition (J2EE) specification, the J2EE Connector Architecture (JCA) specification and the Java Message Service specification (J2EE is a trademark of Sun Microsystems Inc.).

The J2EE specification defines a standard for developing multi-tier enterprise applications, particularly in web based environments. The JCA specification defines an architecture for providing connections to existing enterprise information systems (EIS) and JMS defines an interface for providing connections to messaging systems.

The JCA specifies two aspects of EIS support, the first (server) aspect is implemented by the application server and specifies how the application server integrates an EIS provider into the server thereby providing, for example transactional and security facilities, whilst the second (resource adapter) aspect is implemented by the EIS provider and specifies interfaces which the EIS provider must provide in order to be integrated by the first aspect. The JMS, on the other hand, only specifies one aspect which describes the interfaces the messaging system must provide in order to be accessible to an application. The JMS does not specify an architecture by which this can be integrated into the facilities of the application server.

Although the function of the resource adapter aspects of JCA and JMS are quite similar in that they provide connections to other systems, their requirements are quite different. For example a JCA resource adapter must provide JCA interfaces for the JCA server aspect to call whereas the JMS does not. Further a connection to an EIS has transactional context and associated security credentials and provides an application with means to communication with the EIS. A JMS connection to a messaging system, however, has only associated security credentials and the application must further obtain a session, as part of the connection, in order to communicate with the messaging system, the session having a transactional context. As a result of these differences a JMS cannot be integrated into the application server using the server aspect of the JCA. Instead the application server provider must define how this is done, and this leads to provider specific solutions.

SUMMARY

According to a first aspect the present invention provides a data processing method for providing a Java Message Service implementation based on a Java Connector Architecture implementation, the method comprising the steps: receiving a request for details of a JMS Connection Factory; creating a JMS Connection Factory Handle which contains details of a JCA Connection Manager; and returning details of the JMS Connection Factory Handle in response to the request.

According to a second aspect the present invention provides a data processing method for integrating a Java Message Service implementation into an application server based on a Java Connector Architecture implementation, the method comprising the steps: receiving a request for a JMS Connection Factory Handle to create a JMS Connection; requesting a JCA Connection Manager to allocate a JMS Managed Connection, wherein the JMS Managed Connection contains details of a JMS Connection; and returning details of a JMS Connection Handle in response to the request, wherein the JMS Connection Handle contains details of the allocated JMS Managed Connection.

According to a third aspect the present invention provides a data processing apparatus for providing a Java Message Service based on a Java Connector Architecture, the apparatus comprising: a JCA connection manager; means for receiving a request for details of a JMS Connection Factory; means for creating a JMS Connection Factory Handle which contains details of the JCA Connection Manager; and means for returning details of the JMS Connection Factory Handle in response to the request.

According to a fourth aspect the present invention provides a data processing apparatus for providing a Java Message Service based on a Java Connector Architecture, the apparatus comprising: a JCA Connection Manager comprising means for allocating a JMS Managed Connection containing details of a JMS Connection; and a JMS Connection Factory Handle comprising: means for receiving a request to create a JMS Connection; means for requesting the JCA Connection Manager to allocate a JMS Managed Connection; and means for returning details of a JMS Connection Handle in response to the request, wherein the JMS Connection Handle contains details of an allocated JMS Managed Connection According to a fifth and sixth aspect the present invention provides a computer program comprising instruction which, when executed on a computer, cause the computer to carry out a method of the first and second aspects, respectively.

Preferably a new JMS Managed Connection and a new JMS Connection are created as a result of requesting a JCA Connection Manager to allocate a JMS Managed Connection. In this case preferably the JMS Managed Connection is provided with Security credentials for use when creating a new a JMS Connection.

Alternatively a pool of previously created JMS Managed Connection is maintained and as a result a previously created JMS Managed Connection and JMS Connection are re-used as a result of requesting a JCA Connection Manager to allocate a JMS Connection.

Optionally JMS Connection Handle can further receive a request to create a JMS Session in which case it requests a JCA Connection Manager to allocate a JMS Managed Session, wherein the JMS Managed Session contains details of a JMS Session and the returns details of a JMS Connection Handle in response to the request, wherein the JMS Connection Handle contains details of the allocated JMS Managed Session. Optionally the JMS Managed Session is registered in a transaction.

Preferably a new JMS Managed Session and a new JMS Session are created as a result requesting a JCA Connection Manager to allocate a JMS Managed Session. Alternatively a previously created JMS Managed Session and JMS Session are re-used as a result of requesting a JCA Connection Manager to allocate a JMS Connection.

The present invention therefore provides a method of integrating a JMS into an application server based on, and using the features of, the JCA. In this method the JMS is integrated based on two separate JCA resource adapter implementations, one for the JMS Connection and one for the JMS Session. This provides the advantage that, a JMS implementation is integrated into the application server, providing access to server facilities such as transaction context and associated security credentials according to a defined architecture. Further the JMS implementation is unaware that it has been integrated. Further advantages of the JCA Architecture, such as concurrent use of a connection by more than one application and connection pooling can be easily provided to the JMS implementation.

Further the JMS Connection is integrated based on one implementation of the JCA which sets transactional context for the JMS Connection to no transaction, and the JMS Session is integrated based on a second implementation of the JCA which sets the security property to no security. In the method the application is unaware that is it dealing with a JCA implementation and not directly with the JMS implementation and the JMS implementation is unaware that it is being called via the JCA and not directly from the application. The method thus provides an architecture for integration of a JMS into an application server which takes advantage of the JCA such as provision of security properties and transactional context to the JMS in a standard way, and JMS connection pooling and sharing.

Embodiments also include a method that invokes a Java Connection Architecture (JCA) connection manager to create a Java Message Service (JMS) connection handle in response to a request for a connection from an application. The JMS connection handle is created. "No transaction" is indicated for transaction context of the JMS connection handle. The JMS connection handle is supplied to the application.

BRIEF DESCRIPTION OF THE DRAWINGS

The invention will now be described, by way of example only, with reference to a preferred embodiment thereof, as illustrated in the accompanying drawings, in which:

FIGS. 9 and 10 are sequence diagrams of the flows which result from an application request to create a JMS connection according to the present invention; and FIG. 11 is a sequence diagram of the flows which result from an application request to create a JMS session according to the present invention.

Note that in the figures like numbers are used to denote like parts.

DESCRIPTION OF EMBODIMENT(S)

Figure 1:
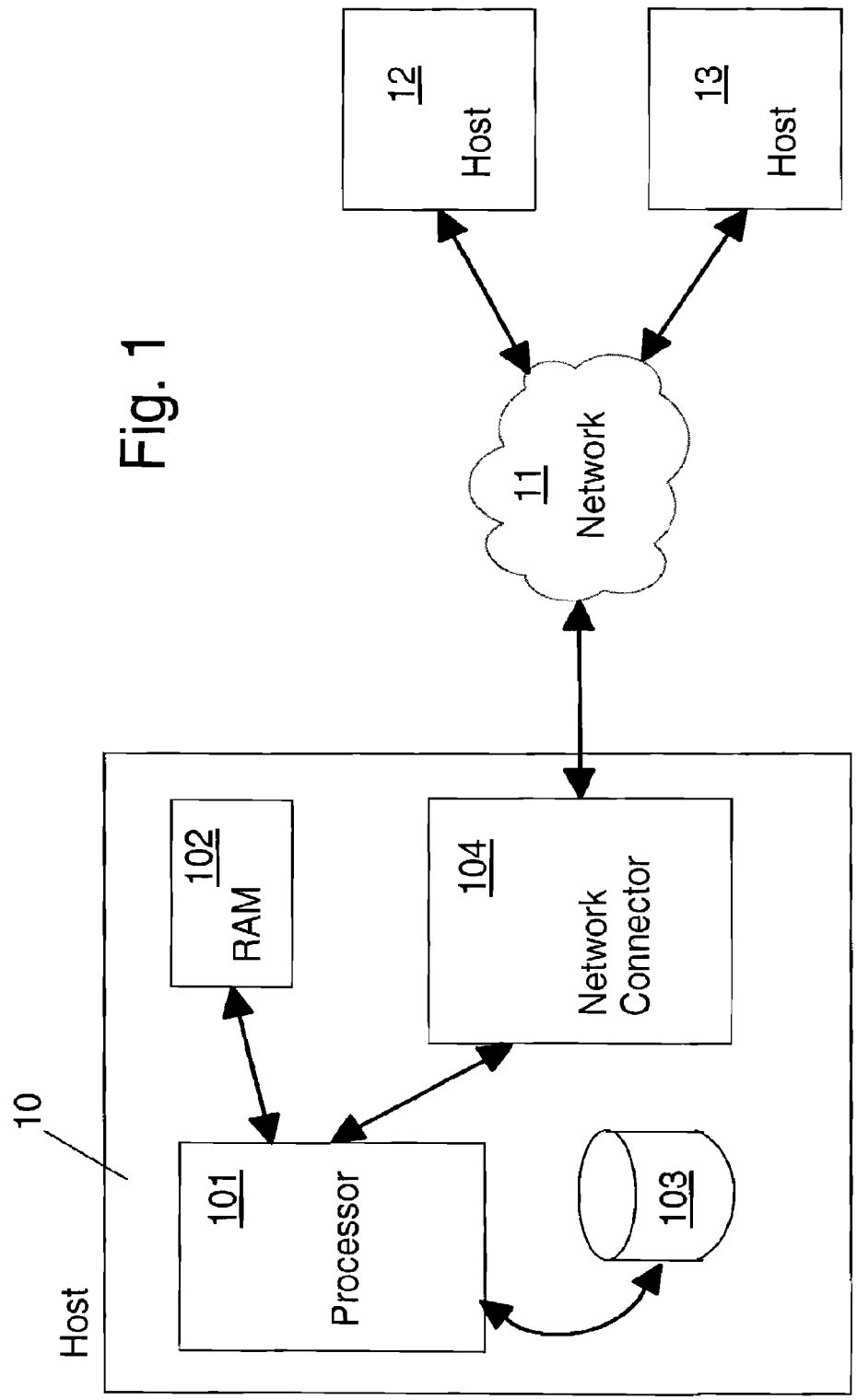
FIG. 1 is a block diagram of a data processing environment in which the preferred embodiment of the present invention can be advantageously applied.

FIG. 1 is a block diagram of a data processing environment in which the preferred embodiment of the present invention can be advantageously applied. In FIG. 1, a client/server data processing host 10 is connected to other client/server data processing hosts 12 and 13 via a network 11, which could be, for example, the Internet. EJB clients and EJB Servers may be installed on any such client/server data processing host. For example hosts 10 and 12 may have EJB clients installed and host 13 may have an EJB Server installed. The EJB Server can further provide support for services specified to the J2EE architecture enabling the EJB Clients to access legacy systems and messaging services also available in data processing host 12, although these may further be provided in separate data processing hosts. Client/server 10 has a processor 101 for executing programs that control the operation of the client/server 10, a RAM volatile memory element 102, a non-volatile memory 103, and a network connector 104 for use in interfacing with the network 11 for communication with the other client/servers 12 and 13.

Figure 2:
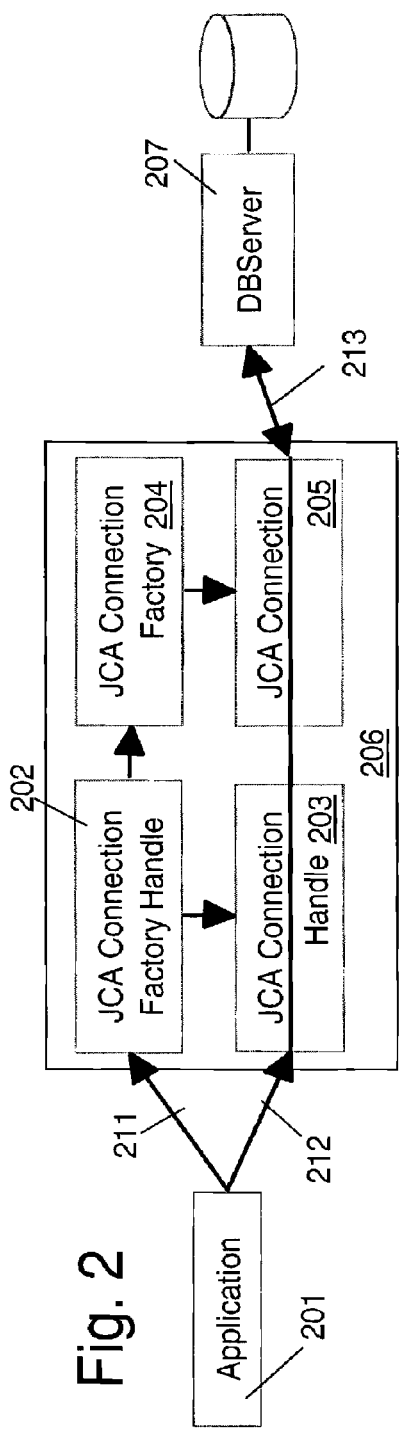
FIG. 2 is a schematic diagram of an application accessing a database server according to the JCA specification.

FIG. 2 shows a schematic diagram showing the very basic flows for an application to access an EIS such as a database server, according to the JCA. The application (201) first locates (not shown) a JCA connection factory using standard techniques, such as JNDI (Java Naming and Directory Interface) lookup, and receives an address for a JCA Factory Handle (202) in response. The application then sends a request (211) to the JCA Factory Handle to create a connection to a DB Server (207). The request is ultimately passed, via other objects defined in the JCA, to a JCA Connection Factory (204) which creates a JCA connection (205) which provides an appropriate connection (213) to the requested DB Server. A JCA Connection Handle (203) is then created to represent the JCA connection (205), and its address returned to the application. The application then sends a request (212) to the JCA Connection Handle to access the DB Server which is then sent over the connection (213), via the JCA Connection (205), to the DB Server (207).

Figure 3:
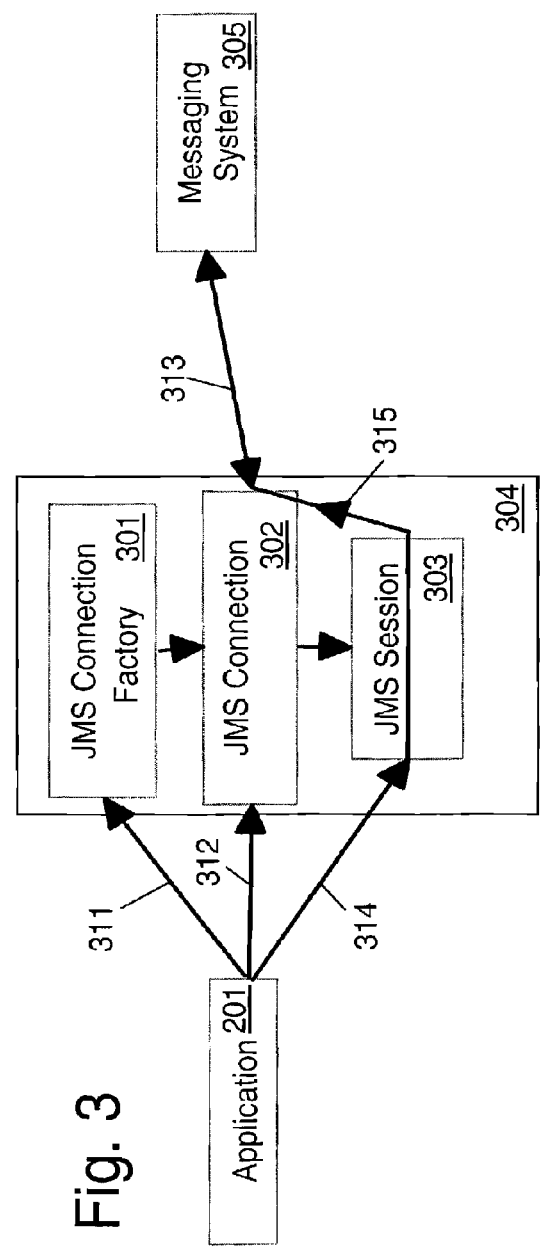
FIG. 3 is a schematic diagram of an application accessing a messaging system according to the JMS specification.

FIG. 3 is a schematic diagram showing the very basic flows for the application to access an messaging system according to the JMS. However note that according to the JMS specification there are two types of connections and sessions, namely queue and topic. As a result, in this and subsequent diagrams "JMS connection" is used to generally refer to either a "JMS topic connection" or a "JMS queue connection", and "JMS session" is used to generally refer to either a "JMS queue session" or a "JMS topic session".

In FIG. 3 the application (201) first locates (not shown) a JMS connection factory using standard techniques, such as JNDI lookup, and receives the address of a JMS Connection Factory (301) in response. The application then sends a request (311) to the JMS Connection Factory to obtain a connection to a messaging system. The JMS Connection Factory creates a JMS connection (302) which establishes a connection (313) to the messaging system, and then returns the address of the JMS Connection to the application. Note that the application may request a queue or a topic connection. The application then sends a request (312) to the JMS Connection to create a session, which causes the JMS Connection to create a JMS Session which establishes a session over the connection (313) to the messaging system. The application may then use the session to send and receive messages to and from the messaging system over the connection (313). Note that the application may use the same JMS Connection to create a plurality of sessions. Further note that the JMS Connection Factory (301), JMS Connection (302) and JMS Session (303) are provided by the messaging system provider.

Figure 4:
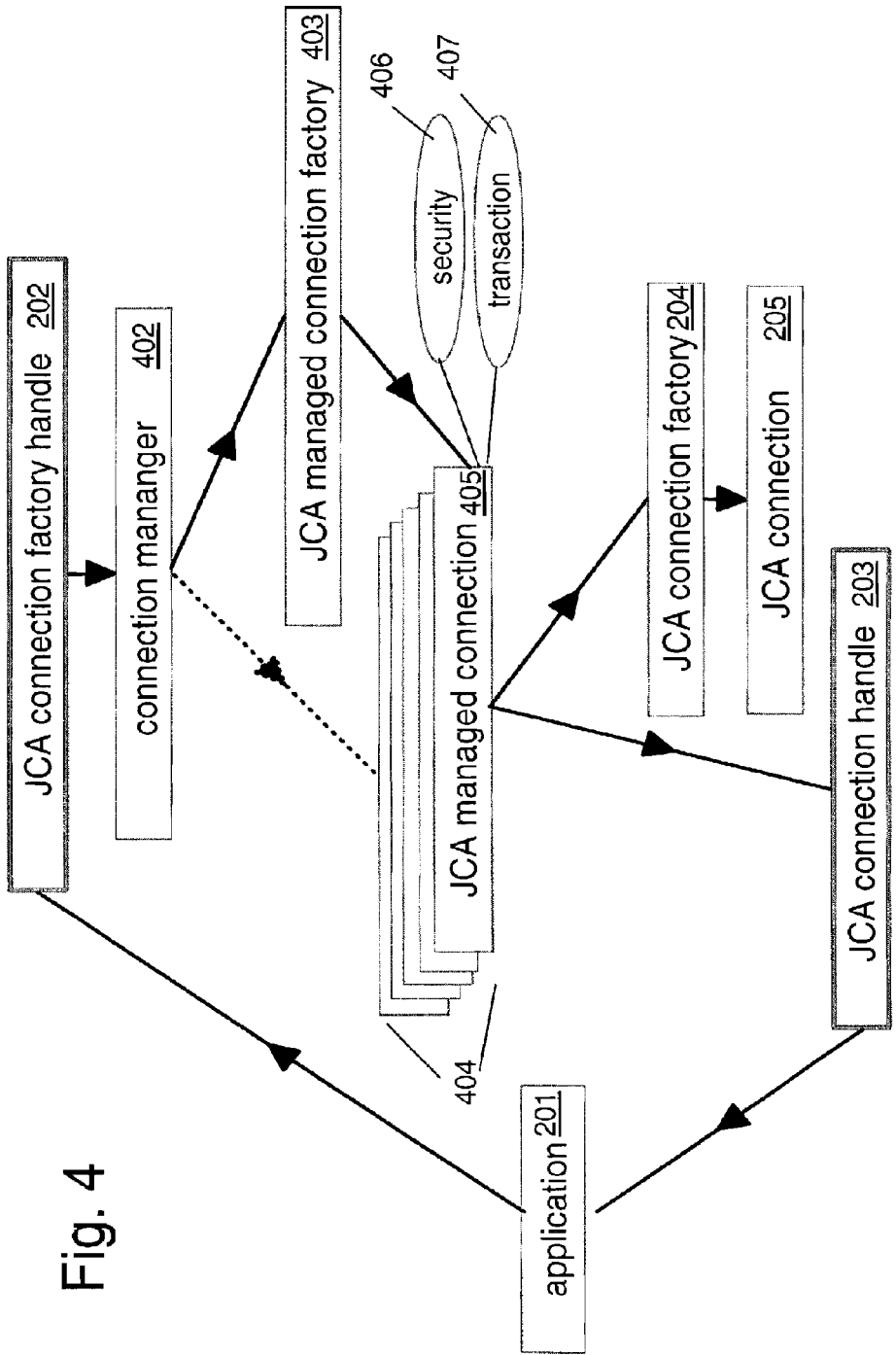
FIG. 4 is a schematic diagram of the JCA object hierarchy, pertinent to the present invention, according to the JCA specification.
Figure 5:
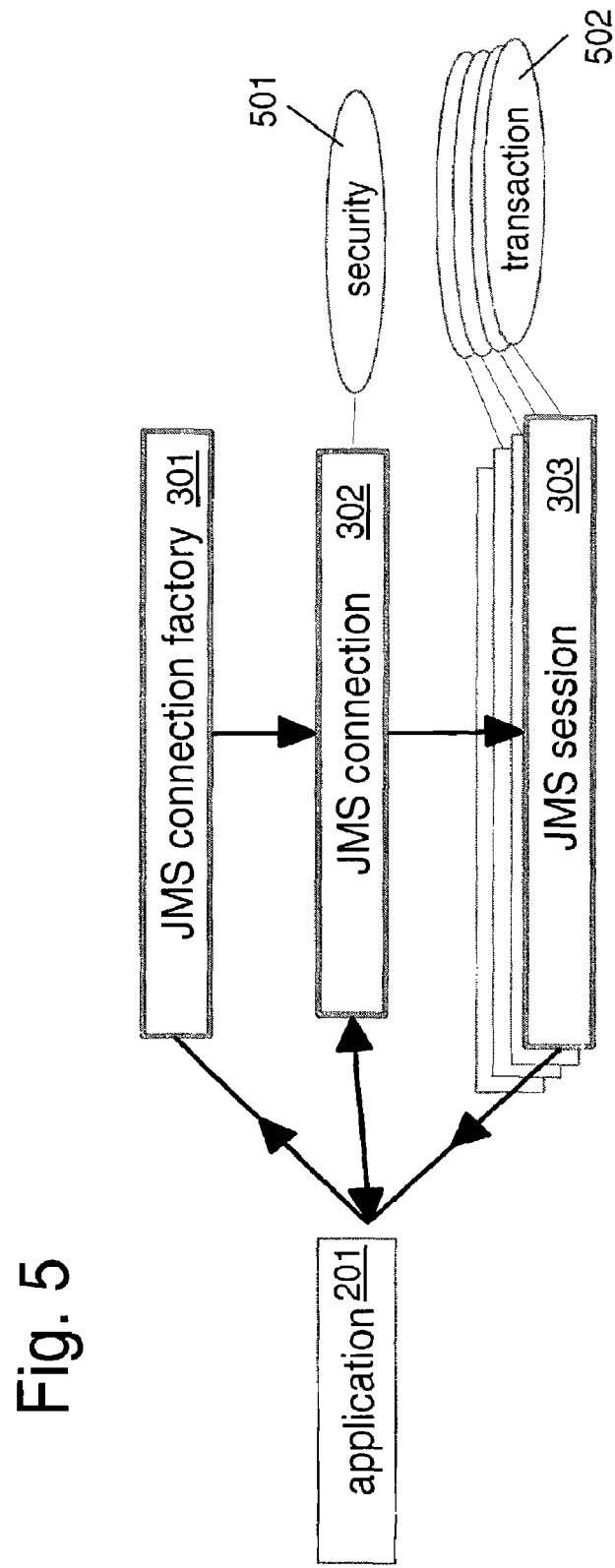
FIG. 5 is a schematic diagram of JMS object hierarchy, pertinent to the present invention, according to the JMS specification.
Figure 6:
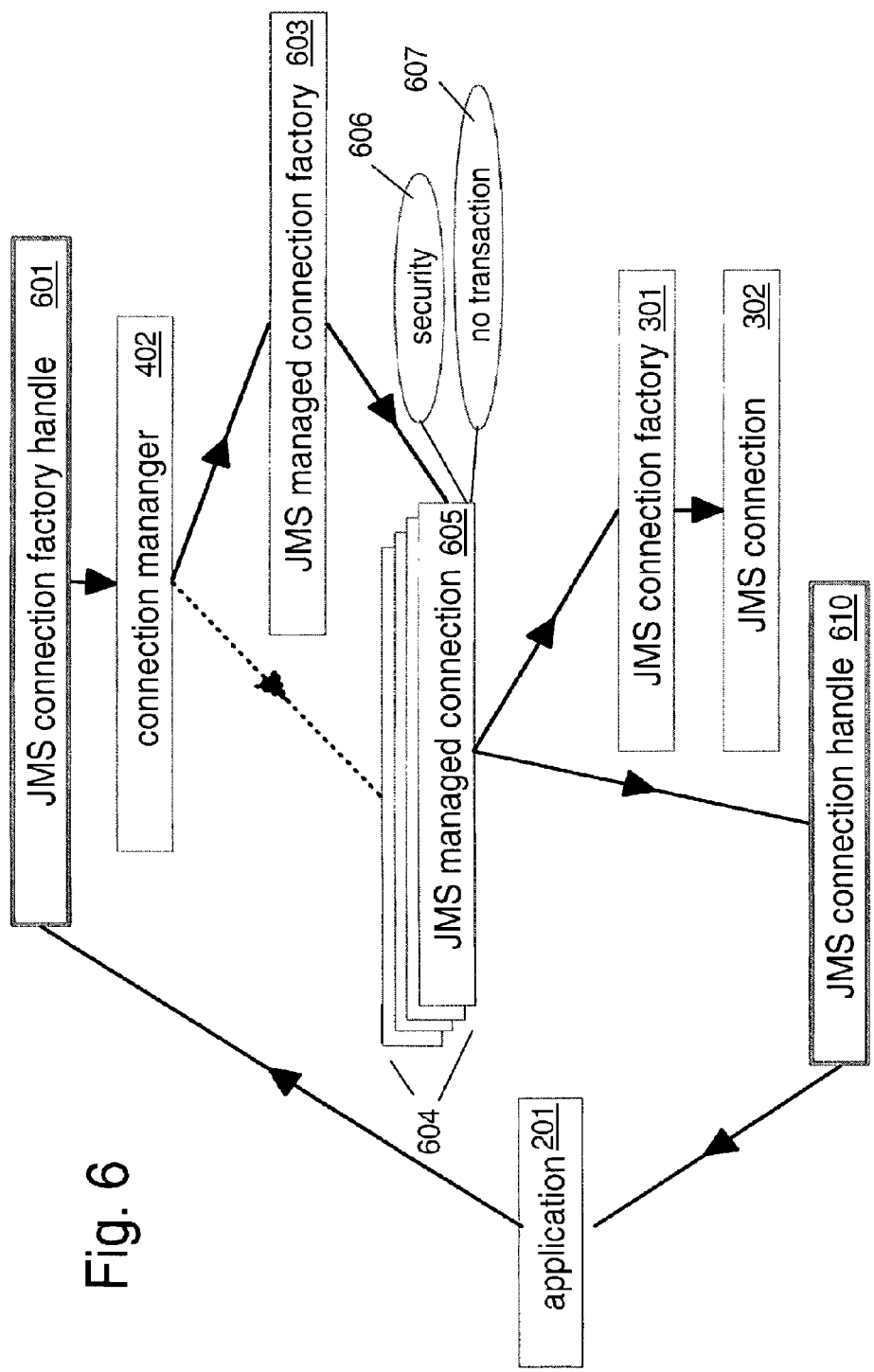
FIG. 6 is a schematic diagram of JMS object hierarchy for a JMS connection implementation based on the JCA, according to the preferred embodiment of the present invention.
Figure 7:
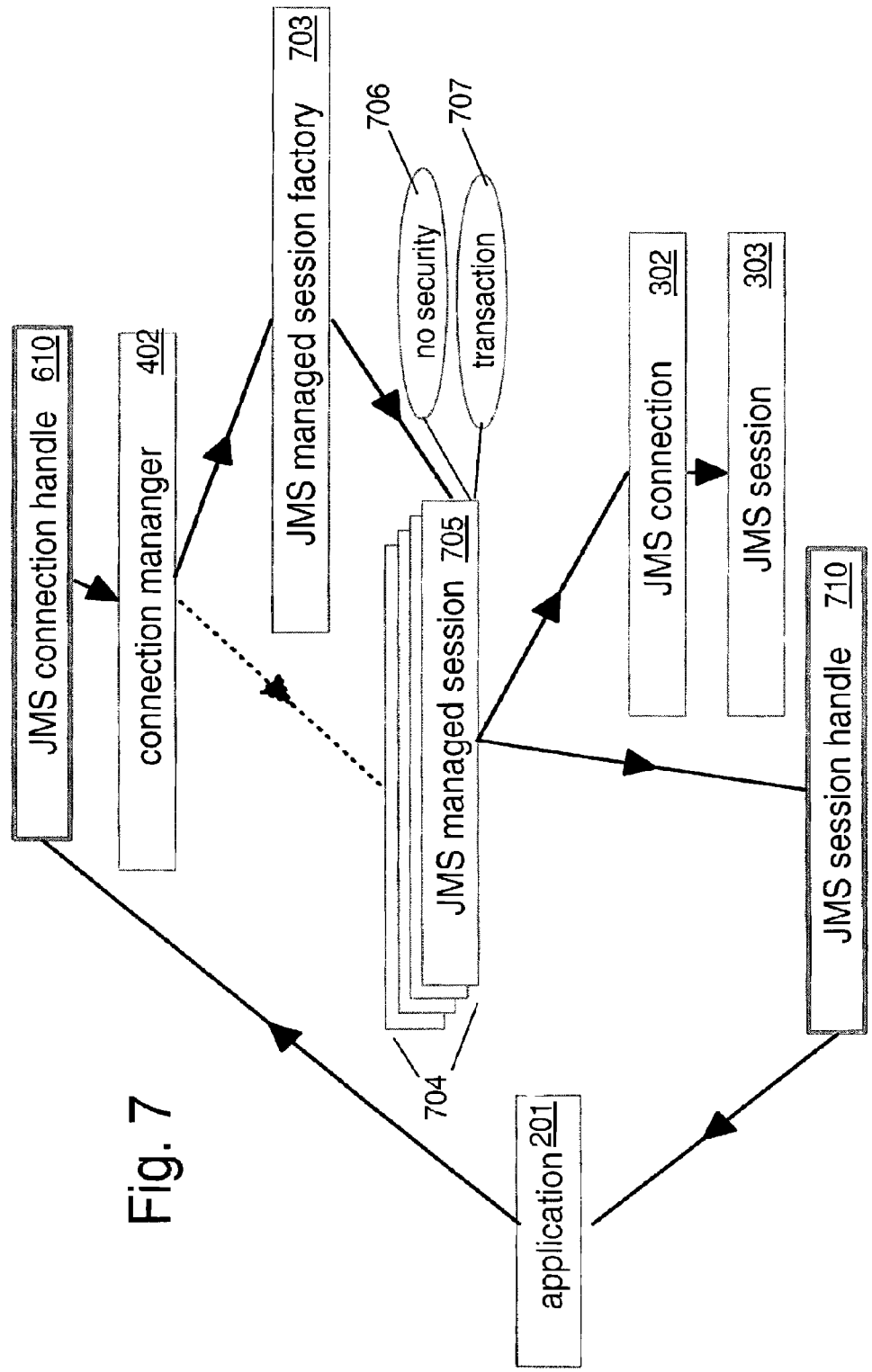
FIG. 7 is a schematic diagram of JMS object hierarchy for a JMS session implementation based on the JCA, according to the preferred embodiment of the present invention.

FIGS. 4 to 7 are schematic diagrams of object hierarchy, pertinent to the present invention, according to the JCA specification (FIG. 4), the JMS specification (FIG. 5), and the present invention (FIGS. 6 and 7). In these diagrams objects shown with a broad outline are made available to the using application.

FIG. 4 is a schematic diagram of the object hierarchy and basic flows according to the JCA specification resulting from requests such as application request 211 of FIG. 2 to obtain a connection to an EIS. Note that in the diagram the JCA Connection Manager (402) is provided by the application server and all other objects which start "JCA" are part of the resource adapter. The JCA Connection Factory handle (202) is an object which the application must locate, using standard methods (e.g.: a lookup in an appropriate namespace of the JNDI (Java Naming and Directory Interface)), in order to request a connection to a required EIS (Enterprise Information System). The JCA Connection Factory handle passes each application request to the JCA Connection Manager (402), which either obtains a suitable existing JCA Managed connection from a pool (404) of previously created JCA Managed Connections, or calls the JCA Managed Connection Factory (403) to create a new JCA Managed Connection (405) which is connected to the EIS. If a new JCA Managed Connection is created it is also added to the pool. The JCA Connection Manager further adds qualities of service to the JCA Managed Connection such as security credentials (406) and transactional context (407) context, based on configuration data. For example the JCA Connection Manager may obtain appropriate credentials to be used for obtaining the connection and register involvement of the connection in an appropriate transaction. The JCA Managed Connection then calls the JCA Connection Factory (204) to create a JCA Connection (205) before creating a JCA Connection Handle (203), containing details of the JCA connection, and returning that to the application.

FIG. 5 is a schematic diagram of object hierarchy and basic flows according to the JMS specification. The JMS Connection Factory (301) is an object which the application must locate, using standard methods, in order to create a JMS Connection, to a required messaging system. The connection may be one of two types, a topic connection or a queue connection. In response to a request from an application the JMS Connection Factory creates an appropriate JMS Connection (302), using security credentials provided by the application, and returns the address of it to the application. The application then uses the JMS Connection to create one or more JMS Sessions (303) each with a transaction context (502). A JMS Session may then be used to create senders, receivers and messages (not shown) for communication with the messaging system to which the connection was obtained. Note that the JMS Connection and JMS Session are provided with interfaces which enable the application to inform it of its security credentials and whether or not it is involved in a transaction but does not specify a method by which the application server enables this.

It can be seen from FIGS. 4 and 5 that the JCA and JMS object hierarchies, and therefore architectures, are different. For example the JCA Managed Connection (405) has associated security credentials (406) and transactional context (407) where the JMS Connection (302) only has a associated security credentials. Also the JMS Connection (302) provides the ability to create JMS Sessions (303) with transactional context, where the JCE Connection (205) does not. Further the JCA provides pooling of JCA managed connections to enable re-use of existing connections where the JMS does not. However, the present invention provides a method of integrating a JMS implementation into an application server based on the JCA architecture and FIGS. 6 and 7 are schematic diagrams of object hierarchy of this method. This enables the JMS to be provided with advantages associated with the JCA, such as integration with server security and transaction services, and connection pooling and re-use. In order to achieve this, the JMS connection and JMS session objects are integrated into the application server based on two separate implementations of a JCA resource adapter.

FIG. 6 is a schematic diagram of the JMS object hierarchy and basic flows for a JMS connection to be integrated into an application server based on the JCA, according to the preferred embodiment of the present invention. A JMS Connection Factory handle (601), when requested to create a JMS connection, passes on the request to a JCA Connection Manager (402). The JCA Connection Manager then either obtains a suitable existing JMS Managed Connection from a pool (604) of previously created JMS Managed Connections, or calls the JMS Managed Connection Factory (603), which is based on a JCA Managed Connection Factory (403 of FIG. 2), to create a new JMS Managed Connection (605), which based on a JCA Managed Connection (405 of FIG. 2) and is connected to the required messaging system. The JMS Managed Connection is then informed of the associated security credential (606) to be used for obtaining the connection although the transactional context (607) is set to "no transaction" as a JMS Connection does not have an associated transaction context. Further each new connection is added to the pool of JMS Managed Connections (604). The JMS managed connection then calls the JMS connection factory (301), passing the security credential, to create a JMS Connection (302), from the objects which, according to the JMS specification are available to the application. The JMS managed connection then creates a JMS connection handle (610) which is returned to the application and appears to the application to be a JMS Connection. Note that in this figure the JMS connection factory (301) and the JMS Connection (302) are the same as those shown in FIG. 3.

FIG. 7 is a schematic diagram of the JMS object hierarchy and basic flows for a JMS session implementation based on the JCA, according to the preferred embodiment of the present invention. The JMS connection handle (610), when requested to create a JMS session, passes the request on to a JCA Connection Manager (402). Note that this can be the same or a different instance of the JCA Connection Manager of FIG. 6. The JCA Connection Manager then either obtains a suitable existing JMS managed session from a pool (704) of previously created JMS managed sessions, or calls the JMS managed session factory (703), which is based on a JCA managed connection factory (403 of FIG. 4), to create a new JMS managed session (705), which based on a JCA Managed Connection (405 of FIG. 4) and is connected to the required messaging system. The JMS managed session is then registered into an appropriate transaction by the JCA Connection Manager. Note that the JCA Connection Manager does not inform the JMS Managed Session of its security credentials as the security property is set to "application" for the managed session factory. As a result the JCA Connection Manager leaves it to the application to provide the credentials which it does not. However if the application or JCA Connection Manager does pass the JMS Managed Session security credentials these will be ignored. Once created the JMS Managed Session is added to the pool of JMS managed sessions (704). The JMS managed session then calls the JMS connection (302), passing an indication of the transactional context, to create a JMS session (303), the objects which, according to the JMS specification are available to the application. The JMS managed session then creates a JMS session handle (710) which is returned to the application and appears to the application to be a JMS Session object. Note that in this figure the JMS connection (302) and the JMS Session (303) are the same as those shown in FIG. 3.

Accordingly, a JMS implementation can be integrated into an application server based on two JCA resource adapter implementations which interface between the JCA Connection Manager and the JMS Connection Factory, JMS Connection and JMS Session. In this environment the JCA resource adapter implementation can be provided separately to the JMS implementation, for example, by the application server provider and the JMS implementation is unaware that it is not working under the prior art implementation as shown in FIG. 3.

Further, from the perspective of the application, it appears as it is dealing with a prior art JMS implementation as the external behaviour is the same.

There now follows a set of sequence diagrams showing more detailed flows between objects related to the invention. Note that in the diagrams elongated boxes are used to denote when an object is active. As a result the box starts when the object is called and ends when the object returns. This obviates the need to show return flows.

Figure 8:
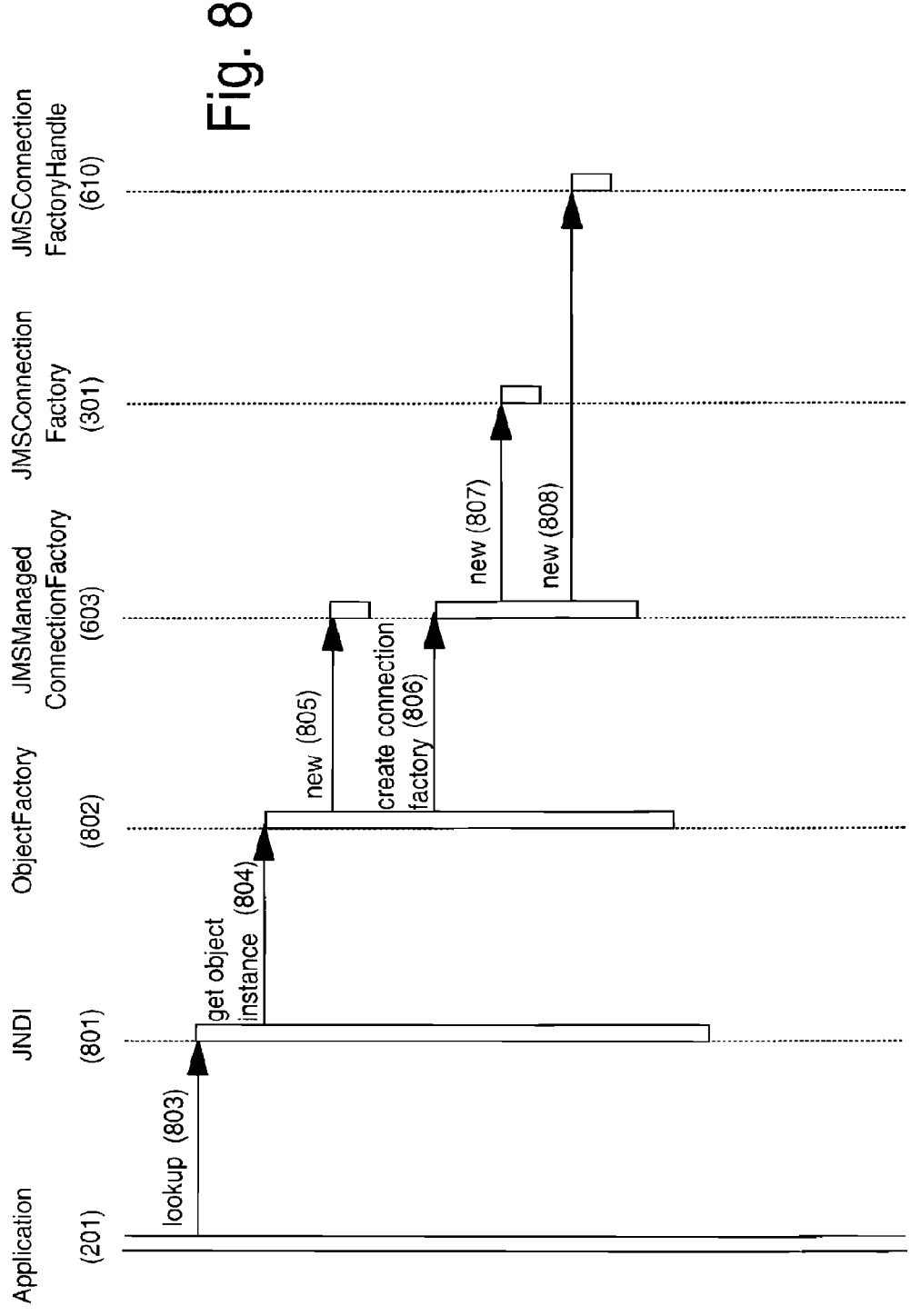
FIG. 8 is a sequence diagram of the flows which result from an application request to lookup, from the Java Naming and Directory Interface, a JMS Connection Factory according to the present invention.

FIG. 8 is a sequence diagram of flows which result from an application request to lookup a JMS connection factory. At step 803 the application request sends a lookup request to the JNDI (801) which then requests, at step 804, an Object Factory (802) for a JMS Connection Factory instance. As a result at step 805 the Object Factory creates a new JMS Managed Connection Factory (603) and, at step 806, requests it to create a JMS Connection Factory and in the process passes to the JMS Managed Connection Factory details of a JCA Connection Manager for future reference. At step 807 the JMS Managed Connection Factory creates a JMS Connection Factory (301), before creating, at step 808, a JMS Connection Factory Handle to which it passes details of the JCA Connection Manager and itself. The JMS Connection Factory Handle is then returned to the Application. Thus, rather than returning a JMS Connection Factory to the application (according to the prior art) a JMS Connection Factory Handle is returned. This looks to the application like a standard JMS Connection Factory object but has been provided with details of objects to enable it to create a JMS Connection object when requested but based on the JCA Architecture. Note that rather than create a JMS Connection Factory at step 807 the JMS Managed Connection Factory may need to do a JNDI lookup to find an existing JMS Connection Factory.

FIGS. 9 and 10 are sequence diagrams of more detailed flows which result from an application request to create a JMS connection according to the present invention. At step 901 the application makes a createConnection request to the JMS connection factory handle (601) to create either a topic connection or a queue connection. The JMS connection factory handle, at step 902, makes a request to the JCA Connection Manager (402) to allocate a JMS Connection, passing details of the JMS managed connection factory (603) to use for this purpose. The JCA Connection Manager may then obtain a previously created JMS Managed Connection, or alternatively, as shown in the flows it requests, at step 903, the JMS Managed Connection Factory (603) to create a new JMS Managed Connection (605) passing with the flow appropriate security credentials to use. As a result, at step 904 the JMS Managed Connection Factory creates a new JMS Managed Connection which calls back to the JMS Managed Connection Factory at step 905 to obtain details of the JMS Connection Factory (301) and the security credentials to be used to create the connection. The JMS Managed Connection then, at step 906, calls the JMS Connection Factory to create a JMS Connection (302) and passes in the security credentials to use. The JMS Connection Factory then create the JMS Connection at step 907. Control then returns to the JCA connection manager which at step 908 calls the JMS Managed Connection to obtain a handle to JMS Connection created. The processing of the JMS Managed Connection, denoted by elongate box 909, is described in FIG. 10.

In FIG. 10, having received the get Connection request (908,) the JMS Managed Connection (605), at step 1002 calls an Object Factory (801) to obtain a JMS Managed Session Factory (702). The Object Factory then, at step 1003, creates a new JMS Managed Session Factory and requests it, at step 1004, to create a JMS Session Factory. However, according to the JMS specification the JMS Connection object is the session factory and so at step 1005 the JMS Managed Session Factory creates a JMS Connection Handle (610) passing it details of a JCA Connection Manager and the JMS Managed Session Factory. Control then returns to the JMS Managed Connection which, at step 1006, calls the JMS Connection Handle passing details of itself, the JMS Connection Handle then passes this information, at step 1007, to the JMS Managed Session Factory. Control then returns to the JCA Connection Manager (402) and, as shown in FIG. 9, control is returned to the application which is given the JMS Connection Handle created a step 1005 of FIG. 10. Thus, rather than returning a JMS Connection to the application (according to the prior art) a JMS Connection Handle is returned. This looks to the application like a standard JMS Connection object but has been provided with details of objects to enable it to create a JMS Session object when requested based on the JCA Architecture.

FIG. 11 is a sequence diagram of the flows which result from an application request to create a JMS session according to the present invention. Note that these are very similar to those of FIG. 9 for a JMS Connection. At step 1101 the application makes a createSession request to the JMS connection handle (610) to create a session. The JMS connection handle, at step 1102, makes a request to the JCA Connection Manager (402) to allocate a JMS Session, passing details of the JMS Managed Session Factory (703) to use for this purpose. The JCA Connection Manager may then obtain a previously created JMS Managed Session, or alternatively, as shown in the flows it requests, at step 1103, the JMS Managed Session Factory (603) to create a new JMS Managed Session (705). As a result, at step 1104 the JMS Managed Session Factory creates a new JMS Managed Session which calls back to the JMS Managed Connection Factory at step 1105 to obtain details of the JMS Connection (302). The JMS Managed Session then, at step 1106, calls the JMS Connection to create a JMS Session (303), which the JMS Connection does at step 1107. Control then returns to the JCA connection manager which at step 1108 calls the JMS Managed Session to obtain details of the JMS Session. The JMS Managed Session then, at step 1109 creates a JMS Session Handle (710) which is returned to the application, but appears to the application to be a prior art JMS Session object. The JMS Session Handle may then be used by the application to create senders, receivers and messages according to the JMS specification.

Note that the flows do not have to happen in the order specified and described with reference to the figures. For example, in FIG. 8 the JMS Managed Connection Factory could defer creating the JMS Connection Factory object at step 807 to when the JMS Connection Factory is first needed, such as prior to step 906 of FIG. 9.

Thus the present invention provides a method which enables a JMS implementation to be integrated into an application server based on the JCA Architecture. In this method the JMS Connection is integrated based on one implementation of the JCA which sets transactional context for the JMS Connection to "no transaction", and the JMS Session is integrated based on a second implementation of the JCA which ignores any security credentials provided. In the method the application is unaware that is it dealing with a JCA implementation and not directly with the JMS implementation and the JMS implementation is unaware that it is being called via the JCA and not directly from the application. The method thus provides an architecture for integration of a JMS into an application server which takes advantage of the JCA such as provision of security credentials and transactional context to the JMS in a standard way, and JMS connection pooling and sharing.

What is claimed is:

1. A method comprising:
    an object factory creating an instance of a Java Message Service (JMS) managed connection factory in response to an application requesting lookup of a JMS connection factory;
    the object factory requesting the JMS managed connection factory to create the JMS connection factory and passing details of a Java Connection Architecture (JCA) connection manager to the JMS managed connection factory;
    the JMS managed connection factory instance creating the JMS connection factory and a JMS connection factory handle;
    the JMS managed connection factory instance passing the details of the JCA connection manager and details of the JMS managed connection factory instance to the JMS connection factory; and
    returning the JMS connection factory handle to the application.

2. The method of claim 1 further comprising the application requesting a connection from the JMS connection factory handle.

3. The method of claim 2 further comprising the JMS connection factory handle obtaining the connection from a pool of JMS connections.

4. The method of claim 2 further comprising:
    the JMS connection factory handle using the details of the JCA connection manager to request the JCA connection manager to allocate a JMS connection; and
    the JMS connection factory handle passing the details of the JMS managed connection factory to the JCA connection manager.

5. The method of claim 4 further comprising the JCA connection manager obtaining a previously allocated JMS managed connection.

6. The method of claim 4 further comprising:
    the JCA connection manager requesting the JMS managed connection factory to create a JMS managed connection;
    the JMS managed connection factory creating the JMS managed connection;
    the JMS managed connection calling back the JMS managed connection factory for details about the JMS connection factory;
    the JMS managed connection calling the JMS connection factory to create the JMS connection; and
    the JMS connection factory creating the JMS connection.

7. The method of claim 6 further comprising:
    the JCA connection manager passing security credentials to the JMS managed connection factory, wherein the security credentials are from the application;
    the JMS managed connection obtaining the security credential from the JMS managed connection factory, wherein the JMS connection factory creates the JMS connection using the security credentials.

8. The method of claim 6 further comprising:
    returning control to the JCA connection manager;
    the JCA connection manager requesting a handle for the JMS connection from the JMS managed connection;
    the JCA connection manager indicating no transaction for transaction context for the JMS connection; and
    passing the handle for the JMS connection back to the application.

9. The method of claim 8 further comprising:
    the JMS managed connection calling the object factory to obtain a JMS managed session factory;

the object factory creating the JMS managed session factory and requesting the JMS managed session factory to create a JMS session factory;

the JMS managed session factory creating the JMS connection handle in response to the object factory requesting the JMS managed session factory to create a JMS session factory;

the JMS managed session factory passing the JMS connection handle the details of the JCA connection manager and details of the JMS managed session factory;

returning control to the JMS managed connection;

the JMS managed connection passing details of the JMS managed connection to the JMS connection handle;

the JMS connection handle passing the details of the JMS managed connection to the JMS managed session factory 10. The method of claim 2, wherein the connection comprises one of a topic connection and a queue connection.

11. A method comprising:

in response to a request for a connection from an application, invoking a Java Connection Architecture (JCA) connection manager to create a Java Message Service (JMS) connection handle;

creating the JMS connection handle;

indicating no transaction for transaction context of the JMS connection handle; and supplying the JMS connection handle to the application.

12. The method of claim 11 further comprising incorporating details of the JCA connection manager, details of a JMS managed connection, and details of a JMS managed session factory into the JMS connection handle.

13. The method of claim 12 further comprising creating the JMS managed connection and the JMS managed session factory.

14. The method of claim 11 further comprising:

creating a JMS connection factory handle, wherein the application requests the JMS connection factory handle to create the connection; and wherein said invoking the JCA connection manager to create the JMS connection handle comprises the JMS connection factory handle requesting the JCA connection manager to allocate the connection.

15. One or more non-transitory machine-readable media having stored therein instructions, which when executed by a set of one or more processors causes the set of one or more processors to perform operations that comprise:

in response to a request for a connection from an application, invoking a Java Connection Architecture (JCA) connection manager to create a Java Message Service (JMS) connection handle;

creating the JMS connection handle;

indicating no transaction for the JMS connection handle; and supplying the JMS connection handle to the application.

16. The non-transitory machine-readable media of claim 15, wherein the operations further comprise incorporating details of the JCA connection manager, details of a JMS managed connection, and details of a JMS managed session factory into the JMS connection handle.

17. The non-transitory machine-readable media of claim 16, wherein the operations further comprise creating the JMS managed connection and the JMS managed session factory.

18. The non-transitory machine-readable media of claim 15, wherein the operations further comprise:

creating a JMS connection factory handle, wherein the application requests the JMS connection factory handle to create the connection; and wherein said invoking the JCA connection manager to create the JMS connection handle comprises the JMS connection factory handle requesting the JCA connection manager to allocate the connection.

19. An apparatus comprising:

a processor;

a network interface; and one or more machine readable media having stored therein instructions, which when executed by the processor causes the processor to perform operations that comprise, invoking a Java Connection Architecture (JCA) connection manager to create a Java Message Service (JMS) connection handle in response to a request for a connection from an application;

creating the JMS connection handle;

indicating no transaction for transaction context of the JMS connection handle; and supplying the JMS connection handle to the application.

20. The apparatus of claim 19, wherein the operations further comprise incorporating details of the JCA connection manager, details of a JMS managed connection, and details of a JMS managed session factory into the JMS connection handle.

* * * * *